W. C. LEE.
MIRROR SUPPORT.
APPLICATION FILED MAR. 30, 1921.
1,387,415.  Patented Aug. 9, 1921.
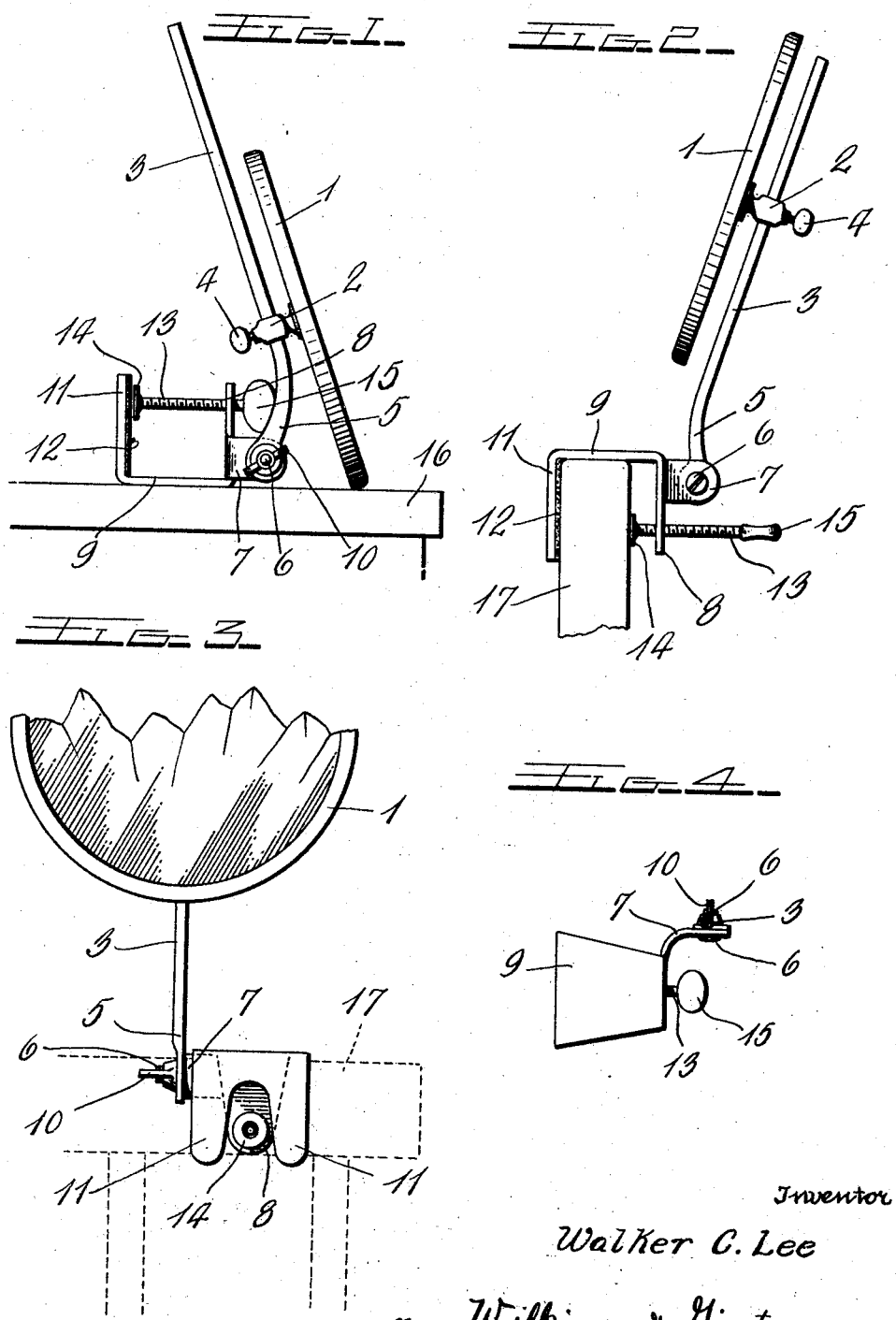
Inventor
Walker C. Lee
By Wilkinson & Giusta.
Attorneys

UNITED STATES PATENT OFFICE.

WALKER C. LEE, OF LOUDONVILLE, OHIO.

MIRROR-SUPPORT.

1,387,415.   Specification of Letters Patent.   Patented Aug. 9, 1921.

Application filed March 30, 1921. Serial No. 456,885.

*To all whom it may concern:*

Be it known that WALKER C. LEE, a citizen of the United States, residing at Loudonville, in the county of Ashland, and State of Ohio, has invented certain new and useful Improvements in Mirror-Supports; and he does hereby declare the following to be a full, clear, and exact description of the invention, such as will enable others skilled in the art to which it appertains to make and use the same.

The present invention relates to improvements in mirror supports and has for an object to provide an improved support whereby the mirror carried thereby may be attached to various articles of furniture or fixtures in a house so that convenient position with reference to the light may be obtained.

Another object of the invention lies in providing an improved support for a mirror having a variety of adjustments for permitting of the location of the mirror at various angles both with respect to the vertical and horizontal to adapt the same for convenient use in shaving, hair dressing and the like operations.

A further object of the invention resides in providing a simple and inexpensive mirror support adapted to be quickly and conveniently attached to and removed from furniture and fixtures and which permits of convenient adjustment of the mirror.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a side view of a mirror and a mirror support constructed according to the present invention with the support in position as a stand for holding the mirror on a flat surface such as a bureau;

Fig. 2 is a similar view of the mirror and support with the clamp arranged on the back of a chair;

Fig. 3 is a front view of the support with the mirror partly broken away; and

Fig. 4 is a plan view of the mirror support.

Referring more particularly to the drawings, 1 designates the mirror which may be of a suitable round or oval form and which is provided preferably centrally of its back with a post 2 having an opening to slidably receive a rod 3 which is clamped in the post by a set screw 4. One end of the post is formed into a curved arm 5 having an enlarged perforated head to receive a threaded bolt 6 which also passes through a perforation in a lug 7 which projects from the leg 8 of a yoke or clamp piece 9. The lug 7 is made in one piece with the yoke projecting outwardly from the same, it being curved in a manner best shown in Fig. 4 in order to carry it beyond the plane of the side of said yoke. A butterfly nut 10 is threaded on the bolt 6 and acts to clamp the curved arm 5 tightly in adjusted position.

The yoke is also formed with a second leg 11 parallel and coöperating with the first mentioned leg 8, this latter leg being preferably faced with a liner of felt 12 or other suitable material to take against the finished surfaces of furniture to avoid marring. The leg 8 carries a clamping screw 13 having a head 14 adapted to take against the opposite surface of an article of furniture or fixture and a thumb piece 15 for rotation.

In use, the mirror 1 may be adjusted longitudinally on the rod 3 so that when the rod is for instance in the position indicated in Fig. 2 the mirror may have a wide range of vertical adjustment. In the same way the mirror is capable of horizontal adjustment when the rod 3 is let down to a horizontal position. The post 2 and mirror 1 may also be adjusted angularly about the rod 3 at any point along the rod so that two adjustments are had through the mirror's connection with such rod 3. Additionally the rod 3 swings about its fulcrum 6 and thus provides for inclining the mirror at various angles to the vertical.

It will be noted that inasmuch as the lug 7 projects laterally beyond the plane of the side of the clamp piece 9 the rod 3 may rotate about the pivot point 6 so that it has a complete range of angular adjustment in this respect through the full 360°. Moreover, this permits the clamp piece 9 to be rotated in a similar way about the same pivot point 6 and for instance permit such clamp piece to be inverted to the position indicated in Fig. 1. Here the top portion of the clamp piece which is inverted is utilized as a stand to rest upon the flat surface 16 for instance of a bureau. The lower edge of the mirror 1 likewise rests upon the supporting surface 16 as is common with mirrors of this general character.

By placing the mirror on the back 17 of a chair such as indicated in Figs. 2 and 3, the user may seat himself upon the chair and be in a convenient position for shaving or a like operation. Of course the clamp 9 is adapted for connection to a variety of articles within a range of thicknesses encompassed by the legs 8 and 11 and the device is preferably comparatively light so that it may be attached to a window shade. Of course the improved support may be used to hold other articles such for instance as ash trays, sewing boxes or other devices and still permit of the same range of adjustments.

It is obvious that various changes and modifications may be made in the details of construction and design of the above specifically described embodiment of this invention without departing from the spirit thereof, such changes and modifications being restricted only by the scope of the following claim:

What is claimed is:—

A device of the character described comprising a mirror, a post extending from the back of the mirror and provided with a perforation extending parallel with the plane of the mirror, a set screw extending through said post, a rod extending through the perforation in the post and adapted to be secured therein by said set screw, said mirror having a longitudinal adjustment on said rod and an angular adjustment about said rod, a curved arm extending from one end of the rod, a clamp piece, means whereby said clamp piece may be secured to a support, a curved lug extending from said clamp piece, means for pivotally holding said rod on said lug, and means whereby the lug and rod may be secured together against relative movement, substantially as described.

WALKER C. LEE.